US011294387B2

(12) United States Patent
Northcutt et al.

(10) Patent No.: US 11,294,387 B2
(45) Date of Patent: Apr. 5, 2022

(54) SYSTEMS AND METHODS FOR TRAINING A VEHICLE TO AUTONOMOUSLY DRIVE A ROUTE

(71) Applicant: Toyota Research Institute, Inc., Los Altos, CA (US)

(72) Inventors: Brandon D. Northcutt, Arlington, MA (US); Christopher Gregg, Mountain View, CA (US); Ewaldo Eder Carvalho Santana, Jr., Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 324 days.

(21) Appl. No.: 16/442,904

(22) Filed: Jun. 17, 2019

(65) Prior Publication Data

US 2020/0393842 A1 Dec. 17, 2020

(51) Int. Cl.
*G05D 1/02* (2020.01)
*G05B 13/02* (2006.01)
*G05D 1/00* (2006.01)

(52) U.S. Cl.
CPC ....... *G05D 1/0221* (2013.01); *G05B 13/0265* (2013.01); *G05D 1/0088* (2013.01);
(Continued)

(58) Field of Classification Search
CPC ........ G06F 17/30241; G08G 1/096725; G08G 1/096805; G01C 21/32; G05B 13/00; G05B 13/0265; G05B 13/02; G05D 2201/00; G05D 2201/02; G05D 2201/0213; G05D 1/02; G05D 1/0221; G05D 1/0231; G05D 1/0246; G05D 1/0278; G05D 1/0255; G05D 1/021; G05D 1/0257; G05D 1/0088; B60W 2050/00; B60W 2050/0062; B60W 2050/0095; B60W 2050/0096; B60W 2050/007; B60W 30/00; B60W 30/02; B60W 30/182; G01S 17/00;
(Continued)

(56) References Cited

U.S. PATENT DOCUMENTS 6,812,888 B2 * 11/2004 Drury ................ G01C 21/3415
342/357.31
8,284,995 B2 * 10/2012 Diaz ...................... G01C 21/32
382/104
(Continued)

FOREIGN PATENT DOCUMENTS

WO 2016183525 A1 11/2016

*Primary Examiner* — Anthony R Jimenez
(74) *Attorney, Agent, or Firm* — Dinsmore & Shohl LLP

(57) ABSTRACT

A system for determining when a vehicle has learned a route is provided. The system includes at least one camera configured to capture image data of an external environment, a processor and a memory module storing one or more processor-readable instructions that, when executed by the processor, cause the system to: generate one or more predictions about objects in the external environment as the vehicle proceeds along the route based on the image data, determine a prediction error based on an accuracy of the one or more predictions, determine a confidence level for the route based on the prediction error, and determine that the vehicle has learned the route in response to the confidence level exceeding a confidence level threshold.

20 Claims, 4 Drawing Sheets

(52) U.S. Cl.
CPC ......... *G05D 1/0231* (2013.01); *G05D 1/0255* (2013.01); *G05D 1/0257* (2013.01); *G05D 2201/0213* (2013.01)

(58) Field of Classification Search
CPC .... G01S 17/00304; G01S 17/06; G01S 17/66; G01S 17/86; G01S 17/87; G01S 17/88; G01S 17/89; G01S 17/93; G01S 17/931; G06T 7/00; G06T 7/20; G06T 7/70; G06T 7/74; G06T 7/80; G06T 7/97; G06T 2207/00; G06T 2207/10; G06T 2207/10016; G06T 2207/20081; G06T 2207/20084; G06K 9/00791; G06K 9/3233; G06K 9/627
USPC .......................................................... 701/25
See application file for complete search history.

(56) References Cited

U.S. PATENT DOCUMENTS

| | | | |
|---|---|---|---|
| 9,365,213 B2* | 6/2016 | Stenneth | B60W 30/00 |
| 9,846,433 B2 | 12/2017 | Tanaka | |
| 9,898,009 B2 | 2/2018 | Shitamoto | |
| 10,034,630 B2 | 7/2018 | Lee et al. | |
| 10,133,275 B1 | 11/2018 | Kobilarov et al. | |
| 10,871,783 B2* | 12/2020 | Julian | G05D 1/0274 |
| 2016/0334230 A1 | 11/2016 | Ross et al. | |
| 2018/0004224 A1 | 1/2018 | Arndt et al. | |
| 2018/0025235 A1 | 1/2018 | OferFridman | |
| 2020/0272148 A1* | 8/2020 | Karasev | G06N 3/08 |

* cited by examiner

SYSTEMS AND METHODS FOR TRAINING A VEHICLE TO AUTONOMOUSLY DRIVE A ROUTE

TECHNICAL FIELD

The present specification generally relates to autonomous vehicles and, more specifically, to systems and methods for training vehicles to autonomously drive a route.

BACKGROUND

Autonomous operation of a vehicle along a route requires sufficient data about the route. Computational systems and networks that support autonomously-capable vehicles may not have sufficient data for routes, and so autonomous operation of vehicles along such a route may be difficult or otherwise undesirable. However, with the collection of sufficient data, vehicles may be able to autonomously operate along a route. One way to gather sufficient data along a route may be to operate a vehicle manually until sufficient data has been collected (e.g., using the vehicle itself), and then shift the vehicle to an autonomous mode. Accordingly, systems and methods for training a vehicle to autonomously drive a route are desired.

SUMMARY

In one embodiment, a system for determining when a vehicle has learned a route includes at least one camera configured to capture image data of an external environment; a processor and a memory module storing one or more processor-readable instructions that, when executed by the processor, cause the system to: generate one or more predictions about objects in the external environment as the vehicle proceeds along the route based on the image data; determine a prediction error based on an accuracy of the one or more predictions; determine a confidence level for the route based on the prediction error; and determine that the vehicle has learned the route in response to the confidence level exceeding a confidence level threshold.

In another embodiment, a vehicle including a system for determining when the vehicle has learned a segment of a route is provided. The system includes at least one camera configured to capture image data of an external environment; a processor and a memory module storing one or more processor-readable instructions that, when executed by the processor, cause the system to: generate one or more predictions about objects in the external environment based on the image data; determine a prediction error based on an accuracy of the one or more predictions; determine a confidence level for the segment based on the prediction error; and determine that the vehicle has learned the segment of the route in response to the confidence level exceeding a confidence level threshold.

In yet another embodiment, a method of autonomously operating a vehicle that includes a system including at least one camera configured to capture image data of an external environment along a route, the method comprising: generating one or more predictions about objects in the external environment as the vehicle proceeds along the route based on the image data; determining a prediction error based on an accuracy of the one or more predictions; determining a confidence level for the route based on the prediction error; and determining that the vehicle has learned the route in response to the confidence level exceeding a confidence level threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
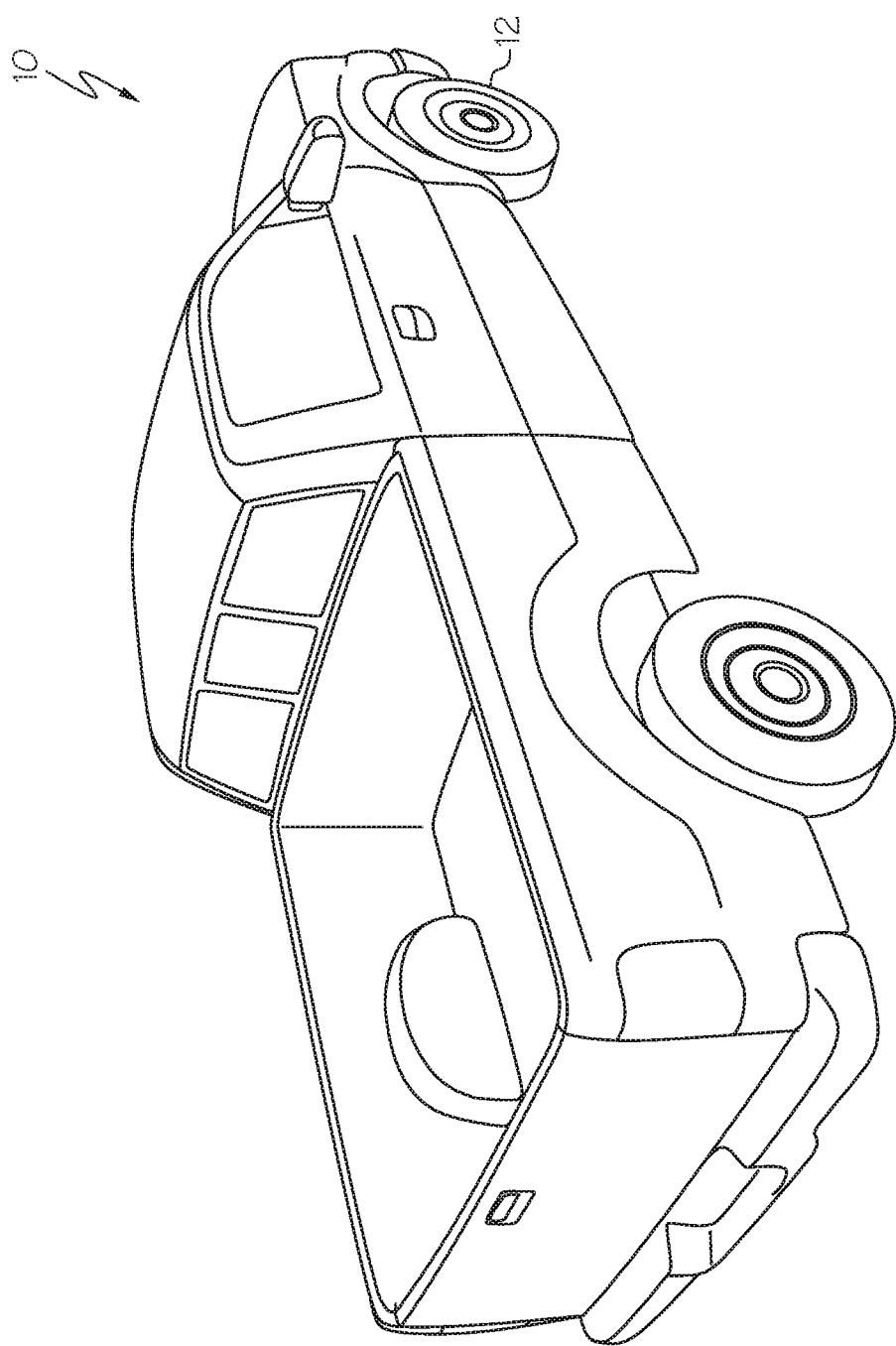
FIG. 1 schematically depicts a vehicle including a system for training the vehicle to autonomously drive the route, according to one or more embodiments shown and described herein.

Vehicles may include one or more sensors that sense objects or characteristics of the internal and external environment of the vehicle. These sensors may be coupled to a processor to classify and track the objects and/or perform dynamic scene analysis or to make one or more autonomous or semi-autonomous decisions based on a classification, a motion profile, and/or other characteristics of the object. Myriad challenges with object detection and classification in a dynamic environment exist, particularly in the case of fused sensor data from multiple types of sensors. Driving environments especially may pose particularly challenging problems with classifying external objects as the sensor system will be subject to constant changes in viewpoint and illumination, object deformation and occlusion, background clutter, and high levels of interclass variation. Despite the fact that, in many instances, the objects and background in a roadway environment may naturally tend toward well-segmented data, the sheer number of possible objects and scenarios that a vehicle may encounter while operating make segmentation and classification a difficult problem to solve.

Moreover, while some driving environments tend toward a readily segmented object environment, the ease with which additional sensors can be added to a system and the limitations in processing power pose additional hurtles to full vehicle autonomy. While the amount of data that must be processed in a driving environment is already high due to the dynamic nature of the driving environment, more sensors of differing types and higher resolution are constantly being added to vehicles. This can mean that the amount of data available increases more rapidly than the ability to process available data.

Indeed, onboard computing capability may be relatively limited. Some vehicles may use general-purpose graphics processing units ("GPGPU") to process data from sensors. GPGPUs are graphic processing units used for general purpose computing. GPGPUs may have characteristics that make them desirable for processing large amounts of data, such as that data coming from the multiple sensors on the vehicle. Even considering the increased performance of GPGPUs, though, the rate at which higher quality data is available may increase faster than the ability to process it. Accordingly, new methods for recording and analyzing recorded data may be required.

Data processing may be particularly challenging in unencountered and/or unfamiliar areas. In such areas, every object or scenario is unknown to onboard processing equipment. Current autonomous systems may not be robust to operating in previously unencountered areas where no data has been collected due to the limitations in processing speed and the relatively unlimited nature of the area surrounding the vehicle.

On the other hand, vehicles that drive the same route or commute each day tend to see similar objects and/or encounter similar scenarios. For example, if a vehicle begins its regular commute each work day on a small, suburban lane, the vehicle may encounter the same row of mail boxes along a street every day or the same stop sign at an end of a lane. The autonomous vehicle may collect new data, analyze the new data, and over time, the vehicle may begin to recognize patterns in objects and scenarios that allow it to operate autonomously in the known environment. In some embodiments, the vehicle may use processed data about a known environment to make one or more predictions about the known environment or unknown environments.

For example, in an autonomous driving mode, a vehicle may use a stop sign to predict its location in an environment and to check its predicted location against data from an additional sensor. Eventually, the accuracy of such predictions could be analyzed and the vehicle may operate autonomously based on the accuracy of predictions. For example, the autonomous driving system may capture image data of a stop sign, compare the captured image data to previously-captured image data, and generate a prediction that the vehicle is at the end of a lane based on the comparison between the captured image data and the previously-captured image data. The system may make similar predictions with respect to numerous objects encountered along the route. Based on the accuracy of the predictions, the system could start to develop a confidence level that the vehicle is familiar with the route. If the confidence level exceeds a confidence level threshold, the vehicle may be comfortable with the route and may autonomously operate on the route.

Referring to FIG. 1, a vehicle 10 including at least one steerable wheel 12, a means for propulsion, and a system for training the vehicle 10 to autonomously drive a route is depicted. The means for propulsion may be, for example, a motor, an engine, etc. The vehicle may be configured to travel from one location to another based on manual operation by an operator of the vehicle 10. Additionally, the vehicle 10 includes one or more on-board computational systems (e.g., processors and memory modules storing processor-readable instructions) and is configured to operate autonomously or semi-autonomously. The vehicle 10 may include one or more systems for sensing the environment external and internal to the vehicle 10 and for switching automatically and manually between the autonomous, semi-autonomous, and manual modes of operation. The vehicle 10 depicted in FIG. 1 is a truck but it is contemplated that the vehicle may be an automobile or any other passenger or non-passenger vehicle such as, for example, a terrestrial, aquatic, and/or airborne vehicle. Additionally, it is contemplated that, in some embodiments, the system for training the vehicle to autonomously drive a route, or portions thereof, may be embedded within a mobile device (e.g., smartphone, laptop computer, etc.) carried by a user of the vehicle 10.

For the purposes of defining various terms of the embodiments disclosed herein, various embodiments may be disclosed herein will be described with reference to the terms "location," "segment," and "route." As used herein, "location" means a unique geographic coordinate defined with reference to a coordinate system, such as a geographic location defined by a particular latitude and longitude. As used herein, "segment" means an ordered series of locations, such as a series of locations between turns. As used herein, "route" means an ordered series of segments.

As used herein, "autonomous" is used to refer to a fully autonomous operation of the vehicle 10. That is, in the autonomous mode, the vehicle 10 is capable of operating without any operator intervention or operation. That is, on a vehicle autonomy scale, autonomous refers to the vehicle 10 operating at a level 5. Conversely, the term "manual" is used to refer to a vehicle that is operating such that the navigation of the vehicle is under the direct control of a human operator. That is, a human operator is, in the manual mode, a human operator steers, accelerates, brakes, causes the transmission to shift between a "Park" and a "Drive" setting, operates a turn signal, and/or takes other manual control of the vehicle. The term "semi-autonomously" is used to describe a difference between the autonomous and the manual modes.

As used herein, "confidence level" refers to the probability that the accuracy of the predictions about the objects and scenarios observed in the external environment that are made by comparing sensed image data ("prediction data" or "prediction image data") to previously-recorded or otherwise stored and accessible image data ("base data" or "base image data") falls within a particular range of possible prediction accuracies. As will be explained in greater detail herein, a more temporally recent sensed image may be compared to previously-recorded image data and a similarity value that represents the similarity between the sensed image data and the recorded image data may be computed using one or more image processing or recognition algorithms.

Figure 2:
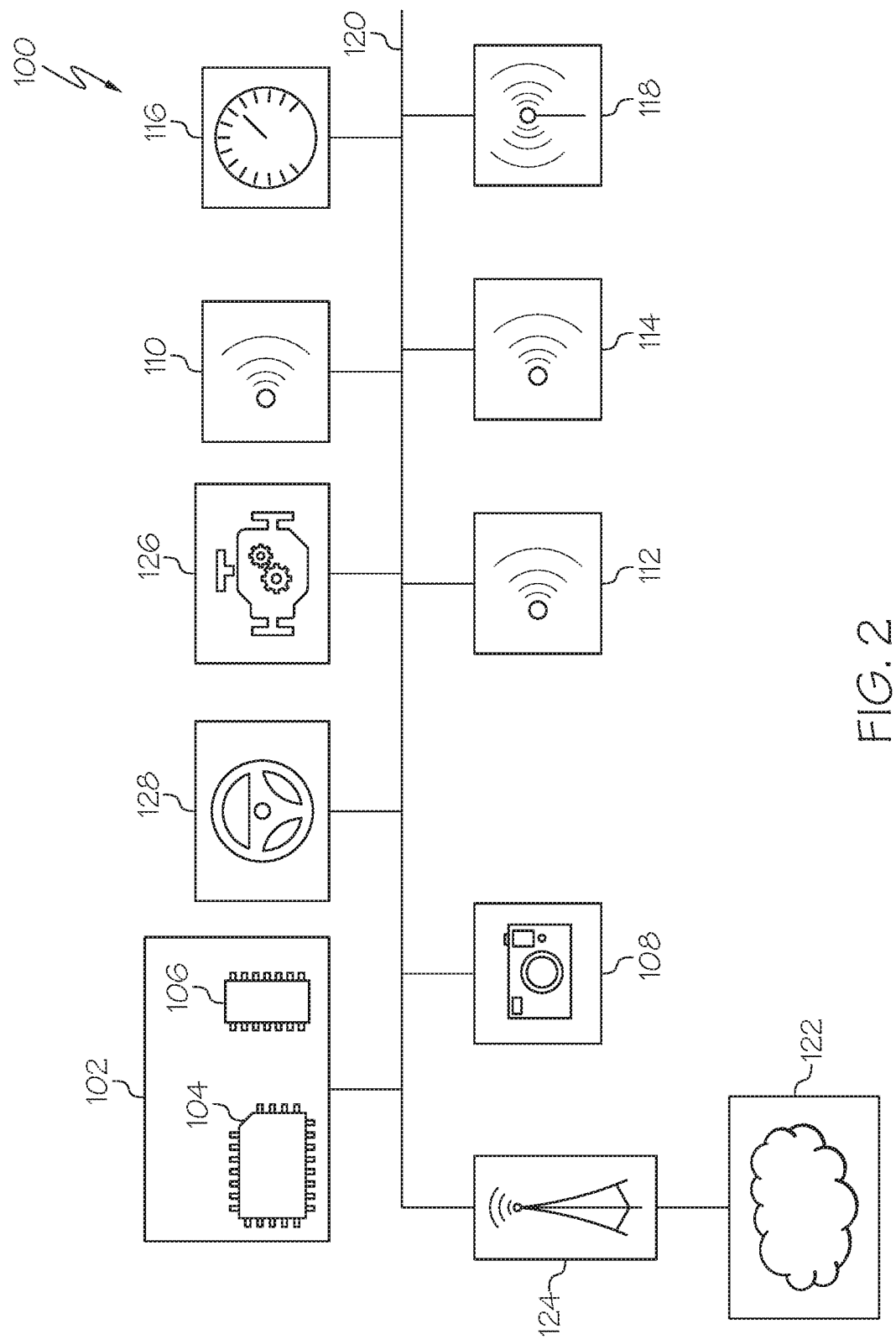
FIG. 2 schematically depicts a system for training the vehicle of FIG. 1, according to one or more embodiments shown and described herein.

Referring now to FIG. 2, a system 100 for training a vehicle, such as the vehicle 10 of FIG. 1, to autonomously drive a route is schematically depicted. The system 100 includes an electronic control unit 102 including a processor 104 and a memory module 106. The system 100 further includes one or more externally-facing sensors, for example, the system 100 includes a camera 108. Some embodiments of the system 100 may further include a lidar sensor 110, a sonar sensor 112, and a radar sensor 114. Additionally, the system 100 includes various reflexive sensors 116 for detecting a status of the vehicle. For example, the system 100 includes a position detection sensor 118 for determining a position, a velocity, and an acceleration of the vehicle. The various components of the system 100 are coupled via a bus 120. In some embodiments, the system 100 may be communicatively coupled with one or more external networks 122 (e.g., a cloud network, vehicle mesh network, etc.) via network interface hardware 124. The system 100 may further include a drive control unit 126 and a steering control unit 128.

The system 100 includes the one or more processors 104. Each of the one or more processors 104 may be any device capable of executing machine readable instructions. Accordingly, each of the one or more processors 104 may be a controller, an integrated circuit, a microchip, a computer, or any other computing device. The one or more processors 104 are coupled to the bus 120 that provides signal interconnectivity between various modules and components of the system 100. Accordingly, the bus 120 may communicatively couple any number of processors with one another, and allow the modules coupled to the bus 120 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the bus 120 may be formed from any medium that is capable of transmitting a signal such as, for example, conductive wires, conductive traces, optical waveguides, or the like. In some embodiments, the bus 120 may facilitate the transmission of wireless signals, such as WiFi, Bluetooth, and the like. Moreover, the bus 120 may be formed from a combination of mediums capable of transmitting signals. In one embodiment, the bus 120 includes a combination of conductive traces, conductive wires, connectors, and buses that cooperate to permit the transmission of electrical data signals to components such as processors, memories, sensors, input devices, output devices, and communication devices. Accordingly, the bus 120 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The system 100 includes one or more memory modules 106 coupled to the bus 120. The one or more memory modules 106 may include RAM, ROM, flash memories, hard drives, or any device capable of storing machine readable instructions such that the machine readable instructions can be accessed by the one or more processors 104. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a static database that includes geographical information pertaining to previously traveled segments and routes and a dynamic database that includes temporal information pertaining to when particular routes and/or segments were traveled. However, it should be understood that other embodiments may not include a static database and/or a dynamic database.

In embodiments that include a static database, the static database generally includes a segment list and a route list. The segment list may include a plurality of segments. Each segment of the plurality of segments in the segment list may include a segment identifier, a segment distance, and a plurality of locations. The segment identifier may be a unique identifier that allows a particular segment to be distinguished from other segments. The segment distance may be representative of the total distance of the segment (e.g., the distance from the starting location of the segment to the ending location of the segment, or the sum of the distances between each pair of successive locations in the segment). Each location of the plurality of locations may include location data, such as latitude, longitude, altitude, speed, course, heading, etc. It should be understood that in other embodiments, each segment in the segment list may include more or less information than described. The route list may include a plurality of routes. Each route of the plurality of routes may include a route identifier and an ordered list of segments. The route identifier may be a unique identifier that allows a particular route to be distinguished from other routes. The ordered list of segments may include an ordered list of segment identifiers, where each segment identifier corresponds to a segment stored in the segment list of the static database.

In embodiments that include a dynamic database, the dynamic database generally includes a route history. The route history includes a plurality of route history entries. Each route history entry may include a route identifier and a route occurrence entry for each time the route was travelled. Each route occurrence entry includes a start date, a start time, a day of the week (e.g., Mon-Sun), a time of the day (e.g., AM or PM), and an ordered list of segments. The route identifier typically corresponds to a route stored in the static database. The ordered list of segments may include an ordered list of segment identifiers, where each segment identifier corresponds to a segment stored in the segment list of the static database. Each segment of the ordered list of segments may also include additional information, such as a start time, an end time, a maximum speed, a minimum speed, an average speed, etc. In some embodiments that include a static database and a dynamic database, the static database and dynamic database are stored in XML format, though it will be appreciated that the static database and dynamic database may be stored in any other format.

Still referring to FIG. 2, the camera 108 is communicatively coupled to the processor 104 and may be coupled to the various other components of the system 100 via the bus 120. While the particular embodiment shown in FIGS. 1, 2, and 3 includes one camera 108, it is to be understood that embodiments may include any number of cameras configured to operate similarly to the described camera 108 and that such cameras may have any field-of-view, capturing image data inside or outside the vehicle. The camera 108 may be any device having an array of sensing devices (e.g., CCD sensors, etc.) capable of detecting radiation in an ultraviolet wavelength band, a visible light wavelength band, or an infrared wavelength band. The camera 108 may include or be associated with a night vision system or low light system. The camera 108 may have any resolution. High resolution may provide for enhanced light and object identification and detection and low resolution may provide faster processing speeds. The camera 108 may be an omnidirectional camera, or a panoramic camera. In some embodiments, one or more optical components, such as a mirror, fish-eye lens, or any other type of lens may be optically coupled to each camera 108. The camera 108 may be positioned within or on the vehicle 10 to view the environment external to the vehicle 10. For example, without limitation, the camera 108 may be positioned in a rear-view mirror, on the dashboard, or near the front-end of the vehicle 10 to capture images of the surroundings in front of the vehicle 10 during operation. The position of the camera 108 is not limited to the rear-view mirror, the dashboard, or the front-end of the vehicle 10. The camera 108 may be positioned anywhere on or within the vehicle 10 to capture images of surroundings of the vehicle 10 during operation. For example, one or more cameras may be positioned with a field-of-view behind the vehicle 10 to capture image data from locations behind the vehicle 10.

The camera 108 captures images of the surroundings of the vehicle and generates image data that is communicated to the processor 104 via the bus 120. The processor 104 may employ one or more object recognition algorithms to the image data to extract objects and features. Any known or yet-to-be-developed object recognition algorithms or facial recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The object recognition algorithms or facial recognition algorithms may be stored in an on-board memory, for example (without limitation) the memory module 106. In some embodiments, image processing algorithms may be stored on the external network 122 and accessed and or downloaded to process images. For example, the system 100 may access image processing algorithms from the external network 122 using network interface hardware 124 and executed by the processor 104.

In some embodiments, the classification of an object may include partitioning of image data into one or more segments based on a classification of the individual pixels in the image data. One or more image segmentation algorithms may be stored in an on-board (e.g., the memory module 106) or external memory (e.g., the external network 122) and accessed via the network interface hardware 124 and may be used to process the image data generated by the camera 108. Example segmentation algorithms include, but are not limited to, thresholding algorithms, clustering algorithms, edge-detection algorithms, region-growing algorithms, and dual clustering algorithms. Other example segmentation techniques or algorithms include region-based semantic segmentation, fully convolutional network (FCN)-based semantic segmentation, and weakly supervised semantic segmentation. Embodiments utilizing region-based semantic segmentation may provide semantic based results based on object classification. FCN-based semantic segmentation may classify pixels at an individual level and can be applied to any size image. Weakly supervised semantic segmentation may exploit annotated bounding boxes or image-level labels. In some embodiments, various segmentation techniques or algorithms may be used on the same image data.

In embodiments, the system 100 may store image data locally (e.g., in the one or more memory modules 106) or externally (e.g., in the external network 122). Image data may be stored with respect to one or more of a particular location, segment, or route. In some embodiments, image data and other data captured by the system 100 may be correlated with a portion of a roadway or other thoroughfare as determined by a navigation system (e.g., a particular stretch of U.S. highway). In some embodiments, the system 100 may request to share data captured by a particular user's vehicle with other vehicles and systems that may be communicatively coupled with the external network 122. For example, the system 100 may request to share content captured by the system (e.g., image data, position data, reflexive sensor data, etc.). The content may be shared, for example, by uploading the content to a library of content on the eternal network that may be accessed by one or more other users. Data from different users may be shared, compared, analyzed, and redistributed to make the system 100 more robust. That is, a user may upload his or her content to an external network and the user may download content from the external network that has been uploaded by other users. Accordingly, a large number of users may share information to a library of external image data with respect to a particular portion of roadway. For example, if multiple people having a system like the system 100 in their vehicle upload data at the intersection between, for example US Interstate Highway 95 and US Interstate Highway 10, the library of data would obtain useful data more quickly than if only one user uploaded his or her data each day after their commute on such particular portion of the road.

Additionally, in some embodiments, the shared content may include traffic information. For example, traffic information (i.e., real-time traffic data reflecting the current and/or historical status of traffic along a route, segment, or at a location) may be stored locally (e.g., in the memory module 106) or accessed remotely (e.g., via a connection with the external network 122). A user may download traffic information via the connection with the external network 122. Traffic information may be used to determine a recommended route.

In some embodiments, the one or more external vehicle environment sensors may include the lidar sensor 110. The lidar sensor 110 is communicatively coupled to the processor 104 via the bus 120. The lidar sensor 110, or light detection and ranging sensor, uses pulsed laser light to measure distances from the lidar sensor 110 to objects that reflect the pulsed laser light. The lidar sensor 110 may be made of solid-state devices with few or no moving parts, including those configured as optical phased array devices where its prism-like operation permits a wide field-of-view without the weight and size complexities associated with a traditional rotating lidar system. The lidar sensor 110 is particularly suited to measuring time-of-flight, which in turn can be correlated to distance measurements with objects that are within a field-of-view of the lidar sensor 110. By calculating the difference in return time of the various wavelengths of the pulsed laser light emitted by the lidar sensor 110 a digital 3-D representation of a target or environment may be generated. The pulsed laser light emitted by the lidar sensor 110 may, in one form, be operated in or near the infrared range of the electromagnetic spectrum, with one example having emitted radiation of about 905 nanometers. Sensors such as the lidar sensor 110 can be used by vehicle 10 to provide detailed 3-D spatial information for the identification of objects near the vehicle 10, as well as the use of such information in the service of systems for vehicular mapping, navigation and autonomous operations, especially when used in conjunction with geo-referencing devices such as the position detection sensor 118 or a gyroscope-based inertial navigation unit (INU, not shown) or related dead-reckoning system.

In some embodiments, data collected using the lidar sensor 110 may be compared and/or combined with the image data from the camera 108 to generate or refine a simulated model of the vehicle environment. In embodiments, the simulated model may be independently generated from the image data. Additionally, other sensor systems and mapping systems such as radar, inertial measurement units (IMU) and the like may be implemented to provide additional data to the processor 104 for processing image data to determine objects and sources of light in the environment of the vehicle 10.

The sonar sensor 112 is communicatively coupled to the processor 104 via the bus 120. The sonar sensor 112 uses sound wave propagation to communicate with or detect objects in the surrounding environment of the vehicle 10. The sonar sensor 112 may emit a sound wave at any wavelength (e.g., infrasonic to ultrasonic sound) using a transponder which may be reflected back from objects in the environment. Data collected using the sonar sensor 112 may be compared and/or combined with the image data from the camera 108 to generate or refine a simulated model of the vehicle environment.

The radar sensor 114 is communicatively coupled to the processor 104 via the bus 120. The radar sensor 114 uses electromagnetic wave (e.g., radio wave) propagation to communicate with or detect objects in the surrounding environment of the vehicle 10. The radar sensor 114 may emit an electromagnetic wave at any wavelength (e.g., 30 Hz to 300 GHz) using a transponder which may be reflected back from objects in the environment. Data collected using the radar sensor 114 may be compared and/or combined with the image data from the camera 108 to generate or refine a simulated model of the vehicle environment.

The reflexive sensors 116 include sensors that are able to determine a status of the vehicle as it travels from one location to another along its commute. For example, the reflexive sensors 116 may measure the speed and/or acceleration of the vehicle on the road (e.g., directly using a GPS sensor or other position detection sensor or by measuring, for example, the magnitude of throttle and/or brake applied by an operator of the vehicle). The reflexive sensors 116 may measure maximum and minimum speeds at various locations along a commute. The reflexive sensors 116 may include gyroscopes, accelerometers, and the like. In some embodiments, the reflexive sensors 116 may measure the force of acceleration during a turn, for example, or may measure the degree of rotation of a steering wheel and the speed of the vehicle to determine how fast an operator drives the vehicle around a turn.

Still referring to FIG. 2, the position detection sensor 118 may be capable of determining the position of the vehicle 10. For example, the position detection sensor 118 may interface with a global positioning system (GPS). The position detection sensor 118 may be communicatively coupled to the processor 104 via the bus 120. The position detection sensor 118 may be capable of generating location information indicative of a location of the vehicle 10 by, for example, receiving one or more GPS signals from one or more GPS satellites. The received signal may be transformed into a data signal indicative of the location (e.g., latitude and longitude) of the position detection sensor 118 by the one or more processors 104. The GPS signal may include location information including a National Marine Electronics Association (NMEA) message, latitude and longitude data set, a street address, a name of a known location based on a location database, or the like. Additionally, the position detection sensor 118 may use any other system or method capable of generating an output indicative of a location. For example, a local positioning system that provides a location based on cellular signals and broadcast towers or a wireless signal detection device capable of triangulating a location by way of wireless signals received from one or more wireless signal antennas.

The network interface hardware 124 is coupled to the processor 104 via the bus 120. The network interface hardware 124 may be any device capable of transmitting and/or receiving data via a network, such as the external network 122. Accordingly, network interface hardware 124 can include a communication transceiver for sending and/or receiving any wired or wireless communication. For example, the network interface hardware 124 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 124 includes hardware configured to operate in accordance with the Bluetooth wireless communication protocol. In another embodiment, the network interface hardware 124 may include a Bluetooth send/receive module for sending and receiving Bluetooth communications to/from a network. The network interface hardware 124 may also include a radio frequency identification ("RFID") reader configured to interrogate and read RFID tags.

In some embodiments, the system 100 may be communicatively coupled to nearby vehicles via the external network 122. In some embodiments, the external network 122 is a personal area network that utilizes Bluetooth technology to communicatively couple the system 100 and the nearby vehicles. In other embodiments, the external network 122 may include one or more computer networks (e.g., a personal area network, a local area network, or a wide area network), cellular networks, satellite networks and/or a global positioning system and combinations thereof. Accordingly, the system 100 can be communicatively coupled to the external network 122 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, as stated above, the external network 122 may be utilized to communicatively couple the system 100 with nearby vehicles. The nearby vehicles may include network interface hardware and an electronic control unit having a processor and non-transitory computer readable memory capable of being communicatively coupled with the system 100 of the vehicle 10. A processor of the nearby vehicle or vehicles may execute a machine-readable instruction set stored in a non-transitory computer readable memory or in another network to communicate with the system 100.

The drive control unit 126 may control the propulsion and/or braking of the vehicle 10 of FIG. 1 and the steering control unit 128 may control the steering and/or other maneuvering of the vehicle 10 of FIG. 1. The drive control unit 126 may be communicatively coupled to the processors 104 via the bus 120. The drive control unit 126 may effect one or more changes to the engine, brakes, or other systems that affect the propulsion of the vehicle (e.g., transmission system, fuel-economy systems, battery systems, etc.). The steering control unit 128 may effect one or more changes to the steering of the vehicle 10 of FIG. 1. For example, the steering control unit 128 may turn the steerable wheel 12 when the vehicle is operating in an autonomous or semi-autonomous mode. The drive control unit 126 and/or the steering control unit 128 may include system inputs and outputs that cause the vehicle to move autonomously from one location to another. In embodiments, the drive control unit 126 and/or the steering control unit 128 include one or more sensors for sensing an input from a user when the vehicle 10 is operating in a manual-control (i.e., non-autonomous or partially autonomous mode) that may be used to recreate the manually-controlled steps autonomously when the vehicle is operating in a partially autonomous or fully autonomous mode.

Figure 3:
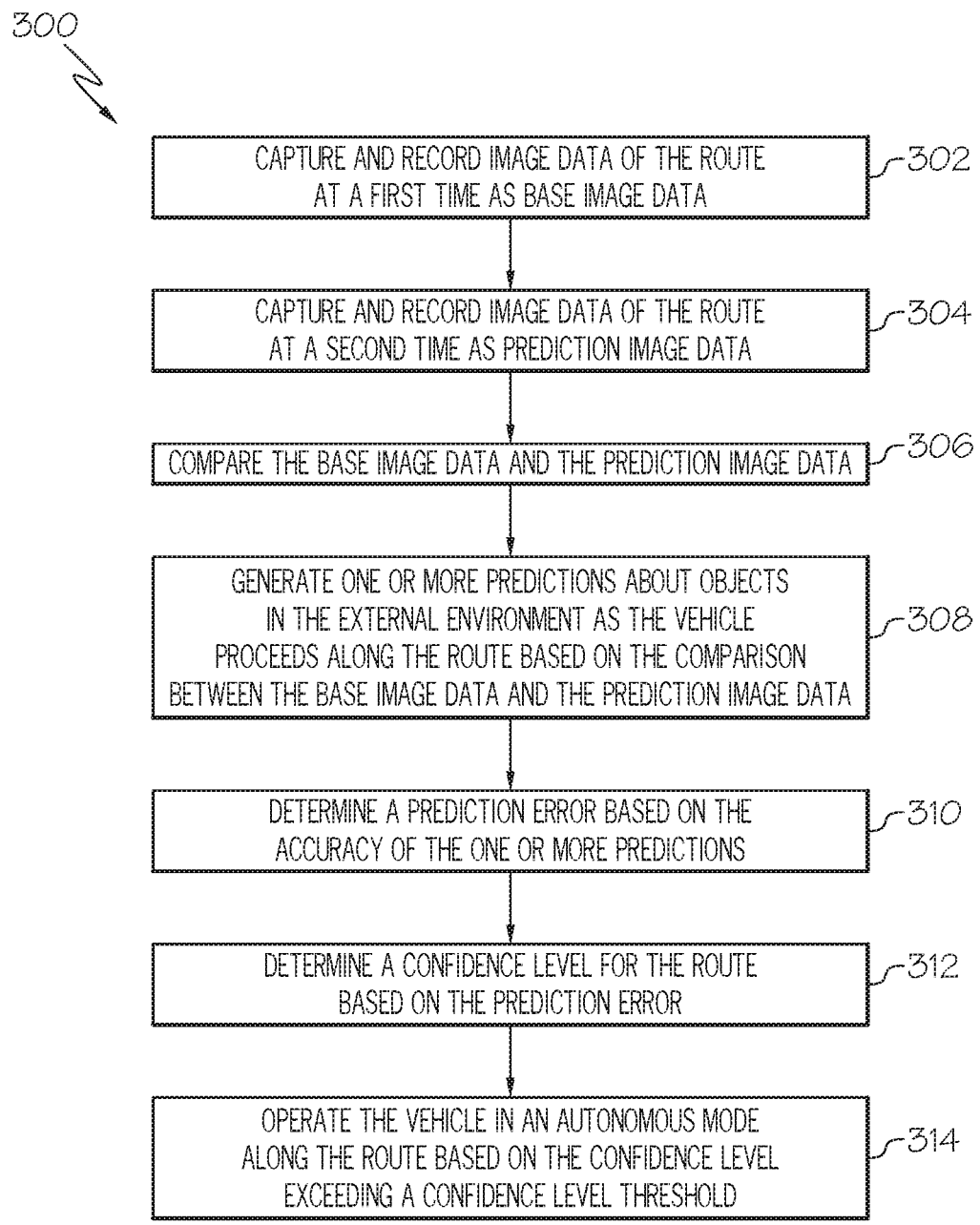
FIG. 3 depicts a method for calculating a confidence interval which may be used to train a vehicle to operate in an autonomous mode, according to one or more embodiments shown and described herein.

Referring now to FIGS. 2 and 3, a method 300 of determining when a vehicle has learned a route is schematically depicted. In some embodiments, the method 300 may be implemented as logic within one or more machine readable instructions that, when executed by the processor 104, automatically determine when a vehicle has learned a route. It is noted that, while the particular embodiment shown in FIG. 3 lists seven steps, additional embodiments are not limited to any particular sequence or number of steps.

At step 302, the system 100 may capture and record image data of the route at a first time as base image data. The system 100 captures the image data with the one or more cameras 108. The base image data is a series of images that are captured as the vehicle moves from one place to another. The base image data may be stored and/or processed such that the system 100 can determine its location by capturing image data at a later point and comparing it to the base image data. That is, the system 100 can compare later images to the images taken at step 302 to navigate (e.g., using vision-based navigation). In some embodiments, the image data is combined with other data, such as, for example, data collected using the reflexive sensors 116, the lidar sensor 110, the sonar sensor 112, the radar sensor 114, the position detection sensor 118, and other sensors.

In some embodiments, the base image data is recorded in the memory module 106. The processor 104 may read and write to the memory module 106 to generate a library of image data that can be accessed by one or more of the components of the system 100. In some embodiments, the base image data is uploaded to the external network 122 via the network interface hardware 124. External processing of the image data may provide increased capability. For example, the image data may be processed using a deep neural network (DNN) (e.g., a convolutional neural network, recurrent neural network, etc.) or other deep learning network.

As the system 100 collects more data as the vehicle 10 continuously drives a route, it may continue to collect base image data. The base image data may be stored and correlated based on the location of the vehicle when the data was collected. For example, the vehicle 10 may collect base data each day as the vehicle drives a commute. The base image data may be collected for a particular location, segment, or route and may be stored with data collected from the same location, segment, or route. In embodiments, the system 100 may include a button or a toggle for activating the system 100 for capturing data. That is, the user of the vehicle 10 may have the capability to turn the system 100 on or off to either allow or prevent the system 100 from collecting image and other data from the surrounding environment. In embodiments in which the vehicle 10 includes a button or toggle for switching the vehicle between a manual operating mode and an autonomous operation mode, the vehicle may operate in a training mode in which the vehicle collects and processes data as described herein. In some embodiments, the training mode may cause the system 100 to record vehicle response to manual instructions of the driver. For example, the position of the accelerator or the brake, the degree of turn of the steering wheel, the speed or acceleration (including deceleration) of the vehicle, etc. The vehicle may be configured to learn multiple routes and to operate autonomously on multiple routes. The vehicle may be configured to select between one or more learned routes automatically when operating in the autonomous based on various inputs to the system. In embodiments, when the system 100 captures the base image data, it may also capture base location data at a first position of the vehicle 10. The base location data may be, for example, a position of the vehicle 10 as determined by the position detection sensor 118.

At step 304, the system 100 may capture and record image data of the route at a second time as prediction image data. The data captured and recorded at the second time may be compared to the data captured and recorded at the first time. In some embodiments, the system may capture the data and associate it with a particular location, segment, or route. That is, the data may be marked or categorized as described herein to correspond to a particular location such that other data from the same location can be compared to the data. For example, data from the base image data set may include location, segment, or route information and may be compared to the corresponding prediction image data. In some embodiments, the image processing algorithms may include classifying detected objects into artificial and natural categories. Libraries of images may be used to train the vehicle what is an artificial landmark and what is a natural landmark. For example, a stop sign may be an artificial landmark and a tree may be a natural landmark. The system 100 may be configured to prioritize navigation based on artificial landmarks, for example, because road signs and other position-indicating and behavior-inducing (e.g., stop lights) objects tend to be artificial and because artificial landmarks are subject to a greater degree of control by human actors and require fewer resources to reproduce giving them greater utility as a candidate for system-wide implementation. In embodiments, when the system 100 captures the prediction image data, it may also capture prediction location data at a second position of the vehicle 10. The prediction location data may be, for example, a position of the vehicle 10 as determined by the position detection sensor 118.

At step 306, the system 100 may compare the base image data and the prediction image data. For example, the system 100 may segment the images of each group of data and classify one or more objects in the image data to determine objects in the image data. The system 100 may generate pose estimates for the objects classified in the image data from multiple data sources. In some embodiments, image data associated with particular objects may be captured from multiple sources and multiple types of sources and may be correlated across the multiple sources and types of sources. For example, a camera at a first location on the vehicle 10 may capture image data of an object (e.g., a stop sign) and a camera at a second location on the vehicle 10 may capture an image of the same object. The object may thus be viewed from multiple angles and pose estimates can be calculated from each of the angles and compared to one another to stereo-navigate the vehicle 10.

In some embodiments, various external objects may be filtered from image processing when processing the base image data and the prediction image data. For example, external vehicles may be filtered from processing due to their dynamic nature in the external environment. That is, vehicles are likely to move with respect to the subject vehicle and the environment, and thus may not be useful for setting a reference frame of objects in an external environment. In some embodiments, the system may compare a random sample of the pixels of the base image data and the prediction image data. Random samples may be selected using any known or to-be-developed sampling technique. For example, random pixel samples may be selected using simple random sampling, stratified sampling, nonprobabalistic sampling, convenient sampling, cluster sampling, or quota sampling.

At step 308, the system 100 may generate one or more predictions about objects in the external environment as the vehicle proceeds along the route based on the comparison between the base image data and the prediction image data. The system 100 may extract one or more patterns from the base image data and may use the patterns to predict which objects it expects to sense at a particular location or along a segment or a route. For example, the system 100 may predict, based on a collection of base data, that a stop sign will be detected at a particular location along a given route. That is, the processor 104 may analyze data including one or more detected objects to determine that an object that has been classified as a stop sign has appeared in a particular location over the course of the last five commutes from a given location. Based on the stop sign appearing at the same location over the course of the last five commutes, the system 100 may generate a prediction that a stop sign is expected at the same location it has been detected over the last five trips to this area. The system 100 may calculate large numbers of predictions based on one or more characteristics of the particular location at which the vehicle 10 is operating, based on one or more segment features, and/or based on one or features of a route. For example, if a segment has a particularly large amount of data collected for the segment as base image data, the system 100 may make a comparably large number of predictions along the segment in order to increase the likelihood that the vehicle 10 is to make the accurate prediction. In some embodiments, the system 100 may make predictions such as the number and type of objects detected and classified in a particular location based on the base image data and other base sensor data (e.g., radar, lidar, sonar, etc.) collected over a number of trips past the sensed location. For example, the system 100 may predict detecting a stop sign, a tree, a fire hydrant, and road markings at a particular location. In some embodiments, the image processing device may compare a representative set of individual pixels of the base image with the prediction image and may interpolate a prediction based on the pixels actually compared. The representative set of the base image pixels may be any size sample or selected from any location of the prediction image.

At step 310, the system 100 may determine a prediction error based on the accuracy of the one or more predictions. For example, the system may predict detecting a stop sign, a tree, a fire hydrant, and road markings at a particular location. If the system 100 actually does detect each of these objects, it may determine a prediction error rate of zero. If the system 100 detects none of the predicted objects, it may determine a prediction error rate of 100. For example, in some embodiments, the system 100 may compare the prediction image data with the base image data to determine the number of locations along a segment or route that have each of the objects classified in a given set of base image data along such segment or route and may determine the likelihood that it is at one of such locations. For example, the system 100 may determine that at five locations along a segment a tree, a stop sign, and a fire hydrant can be seen. Thus, the system may be able to predict that it is at one of these five locations if it can detect each of these three objects within the prediction image data captured at that particular location. By classifying a greater number of objects at each location, the vehicle may effectively decrease prediction error. Additionally, for any given calculation, a larger number of base images for any given set of prediction image data is less likely to result in a prediction error.

At step 312, the system 100 may determine one or more of a confidence interval and a confidence level for the route based on the prediction error. The system 100 may calculate one or more of a confidence interval and a confidence level for a particular location, on a given segment, or on a specific route based on the prediction error. The calculated confidence interval or confidence level may be calculated based on the comparison between prediction image data and base image data. The confidence interval as used herein is defined as the range of values that could encompass the prediction error. The confidence level as used herein is defined as a probability that the prediction error falls within a given range (e.g., the confidence interval) of all possible prediction errors. A confidence level may be calculated for any range of prediction errors. For example, the confidence level may be calculated for a range of prediction errors between 0-15%, between 0-10%, and between 0-5%. It is to be understood that the confidence level may be calculated for any prediction error range. In some embodiments, the confidence level may be calculated by one or more of an informal confidence level calculation, a traditional normal-based confidence level calculation, and a bootstrapping confidence level calculation.

At step 314, the system 100 may operate the vehicle 10 in an autonomous mode along the route based on the confidence level meeting or exceeding a confidence level threshold. The confidence level threshold is the minimum confidence level for a given location, segment, or route at which the vehicle 10 is confident enough of its location to operate in an autonomous mode. In some embodiments, the confidence level threshold is adjustable. For example, the confidence level threshold may be adjustable based on a weather condition. That is, if one or more of the external sensors, the reflexive sensors, or data received via the network interface hardware 124 (e.g., weather data from the Internet) indicates precipitation, it may be more likely that the vehicle 10 would improperly predict the location of the vehicle 10 (e.g., in the case of occluded visual data such as water or snow covering road markings, etc.) and thus, the confidence level threshold may be increased in order to make it less likely that the confidence level meets or exceeds the confidence level threshold thus making autonomous operation less likely. Other road conditions are considered for reasons for not increasing the confidence level threshold. For example, the confidence level threshold may increase based on traffic levels, on speed regulations (e.g., higher speed situations may require higher confidence levels, etc.). In some embodiments, a second confidence level threshold may be calculated and the vehicle may change one or more autonomous operating characteristics based on the confidence level exceeding the second confidence level threshold. For example, the steering of the vehicle 10 may be performed manually by the driver of the vehicle 10 in one instance and upon the confidence level exceeding the second confidence level threshold, the vehicle 10 may take over operation.

Figure 4:
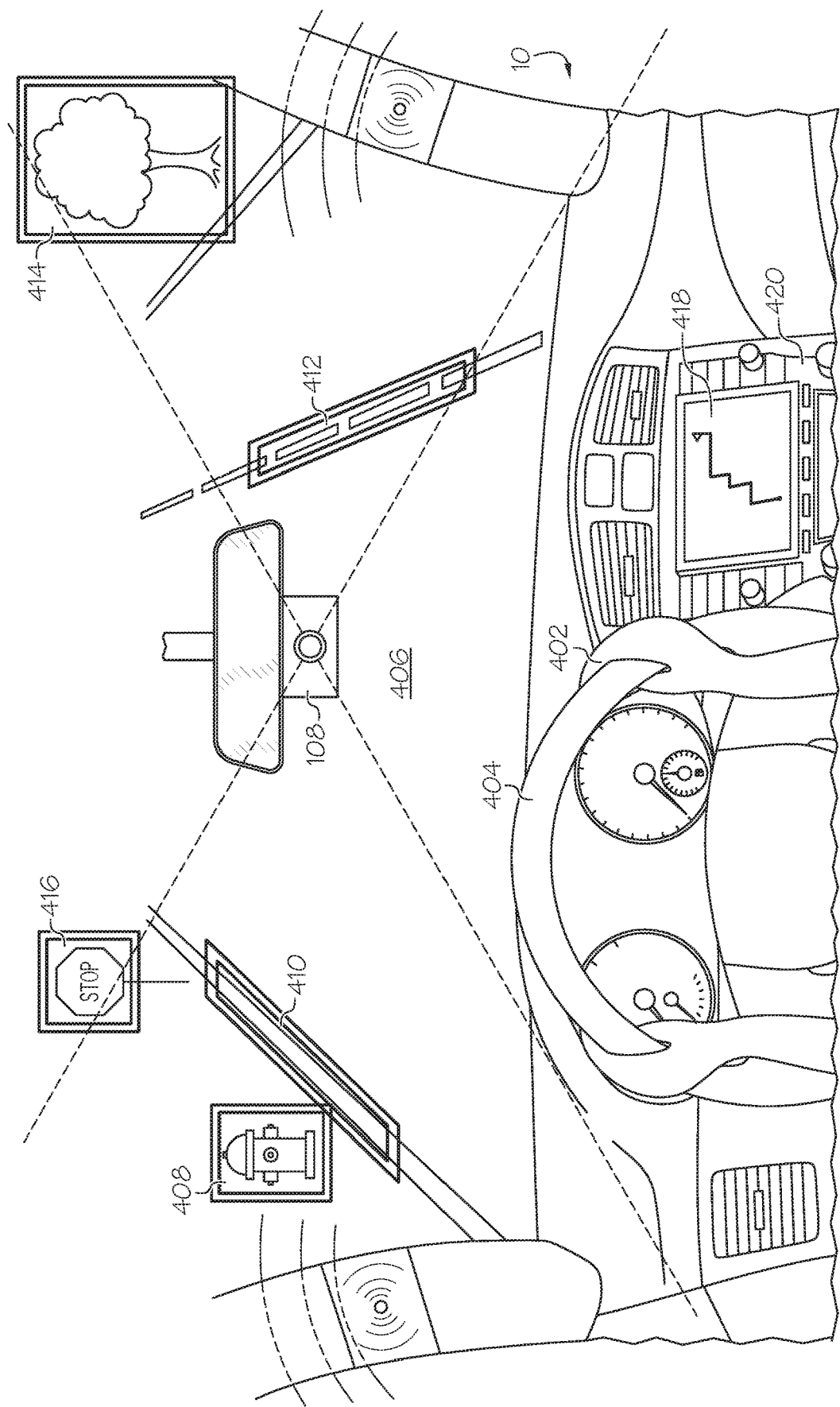
FIG. 4 schematically depicts a scenario for training a vehicle to operate autonomously, according to one or more embodiments shown and described herein.

Referring now to FIG. 4, an exemplary embodiment for using the system 100 of FIG. 2 is depicted. The system 100 includes the camera 108 and the lidar sensor 110. It is to be understood that embodiments of the system 100 could include sonar sensor 112 and/or radar sensor 114, which may operate similarly to the lidar sensor 110. However, reference is made only to the lidar sensor 110 for convenience of explanation.

The vehicle 10 is operating in manual operating mode with a user's hands 402 operating the steering wheel 404. Although not shown in FIG. 4, in the example scenario depicted, the user is also operating the vehicle throttle (e.g., via an accelerator foot pedal) and the vehicle brake (e.g., via a brake foot pedal) as necessary to cause the vehicle 10 to travel down the road 406. As the vehicle 10 travels, the camera 108 records visual data. The recorded visual data may be stored on the vehicle 10, for example, in the memory module 106 and/or may be uploaded to the external network 122, such as the cloud. The recorded data may be processed. For example, one or more of the processor 104 and the external network 122 may segment the image data into one or more segments and classify objects in the image. Similarly, data captured using the lidar sensor 110 (or the sonar sensor 112 or radar sensor 114) may be segmented, classified, and/or identified or may be compared with the image data captured by the camera 108.

As shown in FIG. 4, the system 100 has captured image data of the external environment and segmented the image data into various objects. Several of the objects in the external environment have been indicated as distinct objects by object indicators. It is to be understood that these indicators are not visible to a person viewing the external environment naturally (e.g., with just their own eyes), but instead are representations of the computer-implemented segmenting that divides the image into specific objects. While not visible to the naked eye, the indicators could be graphically depicted on a screen or display communicatively coupled to the processor 104. As shown in FIG. 4, the camera 108 has captured image data that includes images of a fire hydrant 408, a solid line 410 indicating the edge of a lane of the road 406, a dashed line 412 indicating the opposite edge of the lane of the road 406, a tree 414, and a stop sign 416. Additionally, a graphical user interface (GUI) 418 on a heads up display (HUD) 420 in a center console of the vehicle 10 shows a graphical depiction of a route from the vehicle's current location to its destination. In the particular example scenario depicted in FIG. 4, the route is a regular route for the user 402 of the vehicle 10. The user 402 drives the route each day to get to and from work. Accordingly, the vehicle 10 passes these same objects at this same location most work days.

Still referring to the exemplary scenario depicted in FIG. 4, one the first day the user drives this route, the system 100 may capture image data along the route. The camera 108 may be in constant use as the vehicle travels from the user's residence to the user's place of work (i.e., the commute). The system 100 may store this image data locally and/or remotely. Over the course of subsequent days, the system 100 may continue to travel the commute. At some point, the system 100 may have sufficient data to make one or more predictions about what objects it should expect to see along the route. For example, as the vehicle 10 approaches the fire hydrant 408 near the intersection depicted in FIG. 1, the vehicle may make a prediction based on comparing the image data including the fire hydrant captured on previous commutes with the image data including the fire hydrant 408 on the current commute. That is, the vehicle 10 may detect the fire hydrant 408 on the current commute, compare the image data including the fire hydrant 408 from previous commutes and determine that the vehicle 10 should detect the stop sign 416 within a particular amount of time given a particular speed or within a particular distance. As one specific example, the vehicle 10 may determine that it should detect the stop sign 416 within 5 seconds based on the current operating speed of the vehicle or within a 100 feet.

In some embodiments, the vehicle 10 may use one or more inputs from reflexive sensors to increase the accuracy of the prediction. For example, the system 100 may determine a speed of the vehicle 10 based on an input from a speedometer and may determine that, at the current speed, it should detect the stop sign within 20 seconds. Additionally, the system 100 may track inputs from reflexive sensors as metadata associated with the captured and recorded image data and other data enabling such calculations. Other metadata may include, for example, an input from a system clock (e.g., if the vehicle 10 makes the commute at the same time each day, a trip in or outside the commute may carry predictive weight, etc.), input from navigational equipment, and input from the network interface hardware (e.g., triangulation using a cellular service).

If the system 100 detects the stop sign 416 within 15 seconds of the fire hydrant 408, it may record this as a data point that reflects that the system 100 is learning to recognize when the vehicle 10 is travelling the commute (i.e., is on the route). The system 100 may use this data point as one of many to generate a prediction error. That is, in this case, the prediction error is zero, because the system 100 accurately determined that the stop sign 416 would follow the fire hydrant 408. This may increase the confidence level that the system 100 knows the commute. However, in some embodiments, the system 100 may make inaccurate predictions. For example, if along a different segment of the commute not depicted in FIG. 3, the vehicle 10 encounters a fire hydrant that appears similar to the fire hydrant 408 and a tree similar to the tree 414, the system 100 may encounter the fire hydrant 408 and predict that it will detect a stop sign within the next 15 seconds. If the system 100 does not encounter a stop light within this amount of time (i.e., because there is not stop light within the correct distance of the fire hydrant 408), this may affect the prediction error to reflect the error in prediction.

As the vehicle 10 is driven in manual operating mode and the system 100 continues to gather visual and other data and make predictions, the system 100 may develop a confidence level based on the prediction error of the route. Generally, as the number of prediction errors decreases, the confidence level goes up along the route. That is, as the amount of visual and other data recorded and analyzed increases, the system 100 knows the route better and makes better predictions as it travels. In some embodiments, the system 100 may use data from external systems and vehicles to generate predictions. For example, vehicles and/or users may upload data to an external network and the system 100 may access the data to generate predictions about the external environment. Accordingly, the confidence level for the route goes up. In some embodiments, once the confidence level exceeds the confidence level threshold, the system 100 may have a sufficient confidence level on a particular route to autonomously operate the vehicle 10 along the route. The system 100 may indicate to the user that it has a sufficient confidence level along the route and offer the user the opportunity to switch the vehicle 10 to an autonomous mode. For example, the system 100 may display an alert to the user 402 on the GUI 418 of the HUD 420 which may include a toggle button for switching to the autonomous operation mode. In embodiments, autonomous operation refers to autonomously operating one or more of the steering, propulsion, and braking systems.

In some embodiments, the system 100 may generate a confidence level and compare it to a confidence threshold for individual segments of a route. The vehicle 10 may switch between an autonomous and a manual mode based on the confidence level of a particular segment. For example, it may generally be less data intensive for a vehicle to capture images and learn to drive on a highway than on smaller streets where the frequency and magnitude of changes in direction and acceleration (both accelerating and braking) are higher. Accordingly, a route may be broken into segments as discussed herein and the vehicle 10 may switch between autonomous and manual mode based on the confidence score of a particular segment. Additionally, inputs from the various reflexive sensors may be used to determine when segments should be separated from one another. For example, the vehicle 10 may be able to determine when it is operating relatively stable based on a decrease in one or more of the magnitude and frequency of changes in motion of the vehicle (e.g., the vehicle is operating at 65 MPH for long distances or long periods of time without steering changes above 5 degrees, etc.). This may indicate to the vehicle that it is operating on a highway or at a road segment that is otherwise suitable for autonomous operation. Accordingly, the vehicle 10 may save details associated with the segment and may switch to autonomous mode or inquire whether the user would prefer to switch to autonomous mode based on operating in such a segment. Further, the vehicle 10 may determine when it is not operating in such a segment and may switch back to a manual mode.

In some embodiments, the system 100 stores and accesses data about multiple routes and may generate predictions, confidence levels, and confidence level thresholds for multiple routes. For example, a vehicle may prefer to take one route over another based on weather conditions, traffic conditions, or other external conditions. The system 100 may store data along the multiple routes and the system 100 may learn to drive the multiple routes autonomously. In some embodiments, the reflexive sensors include a battery charge level indicator or a fuel level indicator and the system 100 may cause the vehicle 10 to drive a particular route based on the electric charge level or the fuel level of the vehicle 10.

It should now be understood that the vehicle and systems described herein may be used to learn a route between two locations using one or more cameras and/or one or more externally facing sensors. The data captured by the cameras and the sensors may be stored and compared to subsequently captured data to determine a probability that the vehicle is in a particular location based on the comparison. In embodiments, a prediction of the error of location may be made as between two sets of data and based on the prediction, a confidence level may be generated that reflects the confidence with which a system can accurately determine the location of the vehicle based on the comparison in data. Based on a comparison between the confidence level and a confidence level threshold, the vehicle may determine to operate in a fully autonomous mode for a given location, segment, or route. Accordingly, a user may be provided the convenience of autonomous vehicle operation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for determining when a vehicle has learned a route comprising:
    at least one camera configured to capture image data of an external environment;
    a processor and a memory module storing one or more processor-readable instructions that, when executed by the processor, cause the system to:
        generate one or more predictions about objects in the external environment as the vehicle proceeds along the route based on the image data;
        determine a prediction error based on an accuracy of the one or more predictions;
        determine a confidence level for the route based on the prediction error; and
        determine that the vehicle has learned the route in response to the confidence level exceeding a confidence level threshold.

2. The system of claim 1, wherein the system is configured to reduce a frequency of capturing and recording prediction data based on the confidence level exceeding a second confidence level threshold.

3. The system of claim 1, further comprising:
    one or more position detection sensors configured to determine a position of the vehicle, and wherein
    the one or more processor-readable instructions further cause the system to:
        capture and record a first position of the vehicle as base position data;
        capture and record a second position of the vehicle as prediction position data;
        compare the base position data with the prediction position data;
        determine the prediction error based on the comparison between the base position data and the prediction position data;
        determine the confidence level for the route based on the comparison between the base position data and the prediction position data; and
        operate the vehicle in an autonomous mode along the route based on the confidence level.

4. The system of claim 1, wherein the one or more processor-readable instructions further cause the system to generate an alert when the confidence level for the route exceeds the confidence level threshold to inform a user that the system is prepared to autonomously operate the vehicle.

5. The system of claim 1, wherein the one or more processor-readable instructions further cause the system to:
    operate the vehicle in an autonomous mode along the route based on the confidence level exceeding the confidence level threshold.

6. The system of claim 1, wherein the one or more processor-readable instructions further cause the system to:
    capture and record image data of the route at a first time as base data;

capture and record image data of the route at a second time as prediction data; and compare the base data and the prediction data, wherein the one or more predictions about objects in the external environment is generated based on the comparison of the base data and the prediction data.

7. The system of claim 6, further comprising:
one or more of:
one or more lidar sensors;
one or more sonar sensors; and
one or more radar sensors, wherein the base data and the prediction data include one or more of lidar, sonar, and radar data.

8. The system of claim 6 further comprising:
network interface hardware, wherein
the one or more processor-readable instructions, when executed, further cause the system to:
access an external network; and
upload the base data as content to a library of external image data on the external network such that it can be accessed and used by other vehicles with access to the content of the library of external image data on the external network.

9. The system of claim 1, wherein the system is configured to operate in a training mode and in an autonomous mode such that:
in the training mode a user controls at least the steering, propulsion, and braking systems of the vehicle, and
in the autonomous mode, the vehicle autonomously operates one or more of the steering, propulsion, and braking systems of the vehicle.

10. The system of claim 9, wherein the one or more processor-readable instructions further cause the system to automatically shift the vehicle to the training mode based on the confidence level dropping below the confidence level threshold.

11. The system of claim 8, wherein the one or more processor-readable instructions, when executed, further cause the system to:
access the external network;
download content from the library of external image data;
compare the content to one or more of the base data and the prediction data; and
generate the prediction error based on the comparison between the content and the one or more of the base data and the prediction data.

12. The system of claim 8, wherein the one or more processor-readable instructions, when executed, further cause the system:
download traffic information from the external network; and
make one or more recommendations for travelling the route based on traffic information.

13. A vehicle including a system for determining when the vehicle has learned a segment of a route comprising:
at least one camera configured to capture image data of an external environment;
a processor and a memory module storing one or more processor-readable instructions that, when executed by the processor, cause the system to:
generate one or more predictions about objects in the external environment based on the image data;
determine a prediction error based on an accuracy of the one or more predictions;
determine a confidence level for the segment based on the prediction error; and
determine that the vehicle has learned the segment of the route in response to the confidence level exceeding a confidence level threshold.

14. The vehicle of claim 13, wherein the one or more processor-readable instructions further cause the system to:
capture and record image data of the route at a first time as base data;
capture and record image data of the route at a second time as prediction data; and
compare the base data and the prediction data, wherein the one or more predictions about objects in the external environment is generated based on the comparison of the base data and the prediction data.

15. The vehicle of claim 13, wherein the one or more processor-readable instructions further cause the system to:
operate the vehicle in an autonomous mode along the segment based on the confidence level exceeding the confidence level threshold.

16. The vehicle of claim 13, wherein the vehicle is configured to operate in a training mode and in an autonomous mode such that:
in the training mode a user controls at least the steering, propulsion, and braking systems of the vehicle, and
in the autonomous mode, the vehicle autonomously operates one or more of the steering, propulsion, and braking systems of the vehicle.

17. The vehicle of claim 16, wherein the vehicle automatically shifts to the autonomous mode based on:
identifying a particular segment; and
the confidence level for the particular segment being above the confidence level threshold.

18. A method of autonomously operating a vehicle that includes a system including at least one camera configured to capture image data of an external environment along a route, the method comprising:
generating one or more predictions about objects in the external environment as the vehicle proceeds along the route based on the image data;
determining a prediction error based on an accuracy of the one or more predictions;
determining a confidence level for the route based on the prediction error; and
determining that the vehicle has learned the route in response to the confidence level exceeding a confidence level threshold.

19. The method of claim 18, further comprising:
capturing and recording image data of the route at a first time as base image data;
capturing and recording image data of the route at a second time as prediction image data; and
comparing the base image data and the prediction image data, wherein the one or more predictions about objects in the external environment is generated based on the comparison of the base image data and the prediction image data.

20. The method of claim 18, further comprising:
operating the vehicle in an autonomous mode along the route based on the confidence level exceeding the confidence level threshold.

* * * * *

UNITED STATES PATENT AND TRADEMARK OFFICE
CERTIFICATE OF CORRECTION

| | | |
|---|---|---|
| PATENT NO. | : 11,294,387 B2 | |
| APPLICATION NO. | : 16/442904 | |
| DATED | : April 5, 2022 | |
| INVENTOR(S) | : Brandon D. Northcutt, Christopher Gregg and Ewaldo Eder Carvalho Santana, Jr. | |

It is certified that error appears in the above-identified patent and that said Letters Patent is hereby corrected as shown below:

In the Claims

In Column 19, Line(s) 14, Claim 8, after "claim 6", insert --,--.

Signed and Sealed this
Twelfth Day of July, 2022

Katherine Kelly Vidal
*Director of the United States Patent and Trademark Office*